UNITED STATES PATENT OFFICE.

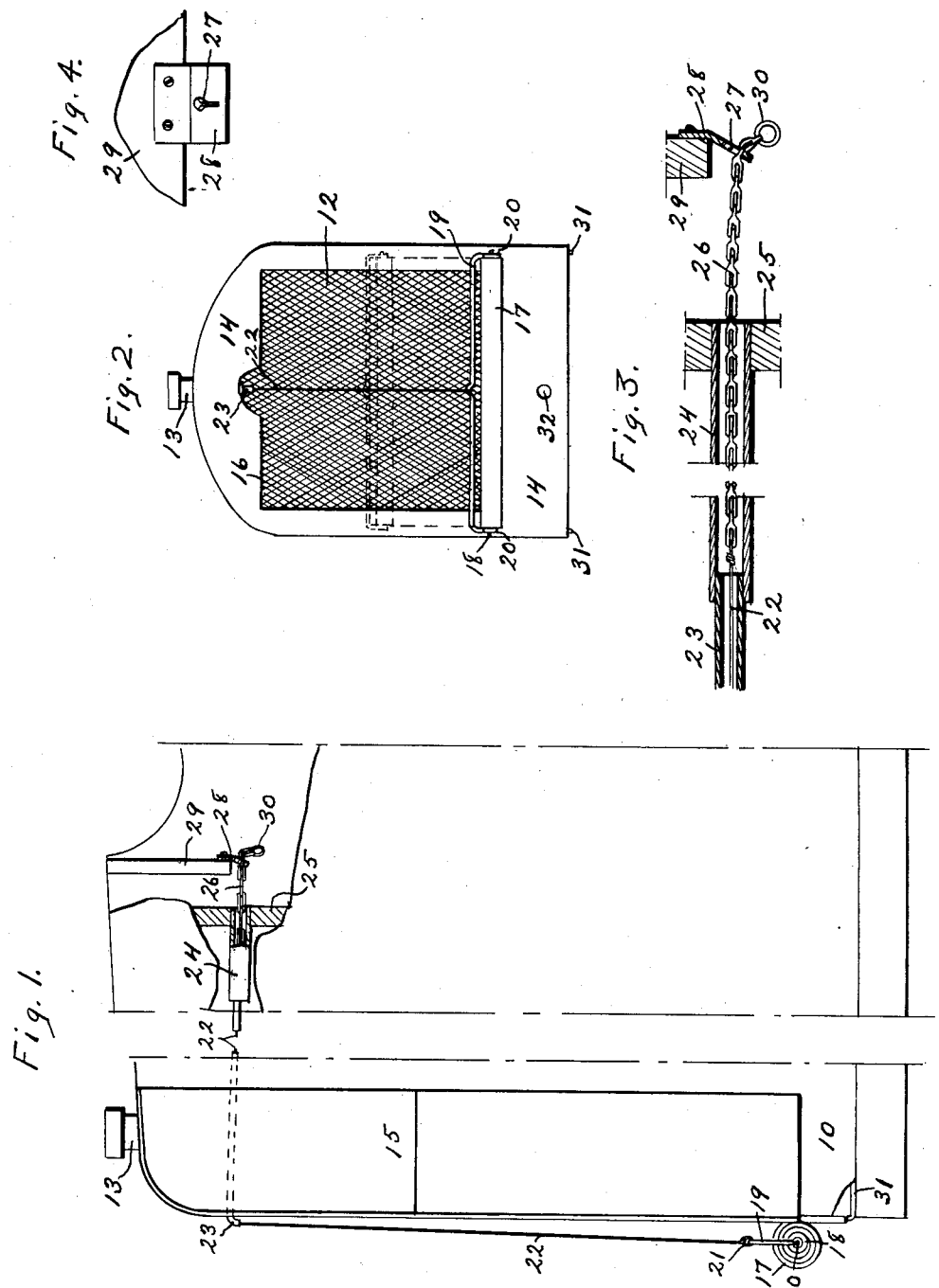

GERHARD R. JANSSEN, OF MANSON, IOWA.

RADIATOR-COVER-OPERATING MEANS.

1,404,527. Specification of Letters Patent. Patented Jan. 24, 1922.

Application filed February 6, 1917. Serial No. 146,898.

*To all whom it may concern:*

Be it known that I, GERHARD R. JANSSEN, citizen of the United States of America, and resident of Manson, Calhoun County, Iowa, have invented a new and useful Radiator-Cover-Operating Means, of which the following is a specification.

An object of this invention is to provide improved adjustable means, controllable from the driver's seat, for regulating the admission of air to the radiator of a motor vehicle.

My invention consists in the construction, arrangement and combination of elements hereinafter set forth, pointed out in my claims and illustrated by the accompanying drawing, in which—

Figure 1 is a side elevation, partly in section, showing my improved device in position for use on an automobile hood. Figure 2 is a front elevation, on a reduced scale, showing the device in position for the admission of air to the radiator, dotted lines indicating the curtain in partially closed position. Figure 3 is a longitudinal section showing the controlling means. Figure 4 is an enlarged detail view of the slotted plate for securing the draft devices.

In the construction of the devices as shown the numeral 10 designates generally the hood of a motor vehicle, provided at its front with a radiator 12 having a filling nozzle 13. My improved protector comprises a front body portion 14 shaped and fitted to the forward end of the hood 10, said body portion being formed with an integral, rearwardly extending flange 15 overlapping the forward end portion of the sides and top of the hood 10. The body portion 14 of the protector is formed with a relatively large aperture 16 registering with and corresponding approximately in size to the radiator 12. A curtain 17 is provided and is adapted at times to overlap the inner margins of the body portion 14 and cover and close the aperture 16 and the radiator 12, and said curtain is secured at its lower margin to the body portion 14 at the lower margin of said aperture. The curtain 17 is fixed at its upper margin to and adapted to be wound on a spring roller 18 of common form, said roller being of the form commonly employed for window curtains except that the locking dogs are omitted, so that the tendency at all times is for the roller to wind the curtain 17 on itself. The curtain when extended occupies a plane between the roller and the face of the radiator and hood, so that it fits snugly to and protects the face of the radiator.

A yoke 19 is formed of a piece of wire and embraces the ends of the roller 18, and the ends of said yoke are formed as eyes 20 in which the ends of the roller shaft are secured. The main portion of the yoke 19 is generally plane and straight and is spaced from the roller 18 sufficiently to permit the winding of the curtain thereon. The yoke 19 preferably is formed with a loop or eye 21 in its central portion, to which a draft wire 22 is secured at one end. The draft wire 22 is extended nearly to the top of the radiator 12 and a tube or sleeve 23 is mounted through said radiator and extends rearwardly through the hood 10 over the top of the motor, and said draft wire is mounted slidingly through said tube. An enlarged tube 24 is mounted through the instrument board 25 of the vehicle and communicates with the tube 23, and a flat chain 26 is secured to the forward end of the draft wire 22 and passes freely through said enlarged tube 24. The end of the chain 26 extends beyond the instrument board 25 and through a key-hole slot 27 in a plate 28 fixed to and projecting downwardly from the lower margin of the dash 29 of the vehicle.

The chain 26 is adapted to be drawn manually through the enlarged portion of the key-hole slot 27 to adjust the position of the curtain 17 relative to the aperture 16, such draft causing an upward movement of the roller 18 and an unwinding of the curtain therefrom. The parts are then held in the desired position of adjustment by downward movement of the chain 26 within the restricted portion of the key-hole slot 27. The end of the chain 26 preferably is provided with an enlarged ring or link 30 to prevent withdrawal of the chain from the slot 27. When it is desired to lower the curtain and roller and expose the radiator the chain 26 is moved upwardly to the enlarged portion of the slot 27 and the spring of the roller 18 acts to wind the curtain thereon and move the cord 22 and chain 26 in a direction opposite to its movement manually as above noted.

In this manner the driver can from his seat regulate and control the extent of the covering of the radiator by the curtain, and when his automobile is standing, or when the weather is very severe, he can entirely close the aperture 16 and entirely cover and protect the radiator 12 against the entrance of air.

The body portion 14, flange 15 and curtain 17 preferably are formed of some suitable material adapted to prevent the entrance of wind, such as oilcloth, and may be provided with a lining of heat-insulating material such as sheet wadding or the like. The flange 15 is formed with an opening in the top to receive the filling nozzle 13, whereby the device receives a support at the top. Hooks 31 preferably are formed on and extend rearwardly from the bottom of the body 14 and are adapted to engage beneath the hood 10 to hold the lower part of the device in place. A hole 32 is formed in the lower portion of the body 14 for the passage of the starting crank of the engine.

I claim as my invention—

1. In an apparatus of the class described having an automobile hood, a radiator at one end of the hood, an instrument board at the other end of the hood and a cover for the radiator, a draft device adapted to be secured at one end to said cover and adapted to be extended through the radiator, hood and instrument board and comprising in its length a smooth wire and a chain, there being means for securing the wire to the cover, there being means to secure the chain to a support, together with a continuous enclosing and guiding tube for said draft device.

2. In an apparatus of the class described, the combination with an automobile hood having a radiator at one end and an instrument board at the opposite end, of a closing device adapted to be extended over the face of the radiator, a continuous tube of two diameters extending through the upper portion of the radiator, hood and instrument board, a smooth wire extending through that portion of the tube of smaller diameter and secured at one end to said closure, and a chain extending through that portion of the tube having the larger diameter and fixed at one end to said smooth wire within the tube, together with a plate mounted on and depending from a suitable support, which plate is formed with a keyhole slot, said chain being extended through said keyhole slot and adapted to engage for retention thereof in a portion of said slot at times.

Signed by me at Manson, Iowa, this 31st day of January, 1917.

GERHARD R. JANSSEN.